(12) United States Patent
Nakajima et al.

(10) Patent No.: US 7,755,001 B2
(45) Date of Patent: Jul. 13, 2010

(54) HIGH CR NI-BASED ALLOY FILLER MATERIAL AND WELDING ROD FOR SHIELDED METAL ARC WELDING

(75) Inventors: Nobutaka Nakajima, Hyogo (JP); Katsuji Dambayashi, Hyogo (JP); Takashi Miyake, Hyogo (JP); Masahiko Toyoda, Hyogo (JP); Seiji Asada, Hyogo (JP); Seiichi Kawaguchi, Hyogo (JP); Yoshihiro Tada, Okayama (JP); Teiichiro Saito, Shizuoka-ken (JP); Norihito Ogawa, Shizuoka-ken (JP)

(73) Assignees: Mitsubishi Heavy Industries, Ltd., Tokyo (JP); Nippon Welding Rod Co., Ltd., Tokyo (JP)

( * ) Notice: Subject to any disclaimer, the term of this patent is extended or adjusted under 35 U.S.C. 154(b) by 722 days.

(21) Appl. No.: 10/597,263

(22) PCT Filed: Jan. 21, 2005

(86) PCT No.: PCT/JP2005/000756

§ 371 (c)(1),
(2), (4) Date: Jul. 18, 2006

(87) PCT Pub. No.: WO2005/070612

PCT Pub. Date: Aug. 4, 2005

(65) Prior Publication Data

US 2007/0272671 A1 Nov. 29, 2007

(51) Int. Cl.
*B23K 35/34* (2006.01)
*B23K 9/23* (2006.01)
*B23K 35/30* (2006.01)
*B23K 35/36* (2006.01)

(52) U.S. Cl. ............... 219/146.22; 219/146.41; 219/137 WM

(58) Field of Classification Search ............ 219/146.22, 219/146.23, 146.41, 146.24, 146.32, 137 WM; 420/442, 447, 449, 452; 428/680
See application file for complete search history.

(56) References Cited

U.S. PATENT DOCUMENTS 4,010,309 A 3/1977 Petersen
4,400,209 A * 8/1983 Kudo et al. ............... 420/443

(Continued)

FOREIGN PATENT DOCUMENTS

JP 59-153858 9/1984

(Continued)

OTHER PUBLICATIONS

Supplementary European Search Report dated Oct. 10, 2007.

*Primary Examiner*—M. Alexandra Elve
(74) *Attorney, Agent, or Firm*—Pearne & Gordon LLP

(57) ABSTRACT

The present invention provides a high Cr Ni-based alloy filler material of which weld cracking resistance can sufficiently be increased by suppressing generation of scales, and a welding rod for shielded metal arc welding that exhibits sufficiently increased weld cracking resistance. The high Cr Ni-based alloy filler material comprises, in percent by weight, C: 0.04% or less, Si: 0.01 to 0.5%, Mn: 7% or less, Cr: 28 to 31.5%, Nb: 0.5% or less, Ta: 0.005 to 3.0%, Fe: 7 to 11%, Al: 0.01 to 0.4%, Ti: 0.01 to 0.45%, V: 0.5% or less, and, as inevitable impurities, P: 0.02% or less, S: 0.015% or less, O: 0.01% or less, N: 0.002 to 0.1%, and the balance: Ni.

3 Claims, 4 Drawing Sheets

U.S. PATENT DOCUMENTS

| | | | |
|---|---|---|---|
| 6,242,113 B1 * | 6/2001 | Kiser | 428/680 |
| 2003/0005981 A1 | 1/2003 | Ogawa et al. | |
| 2003/0118469 A1 | 6/2003 | Kubota et al. | |

FOREIGN PATENT DOCUMENTS

| | | | |
|---|---|---|---|
| JP | 08-174269 | | 7/1996 |
| JP | 08-174270 | | 7/1996 |
| JP | 11-170084 | * | 6/1999 |
| JP | 11347790 | | 12/1999 |
| JP | 2001-107196 | | 4/2001 |
| JP | 2003-501557 | | 1/2003 |
| JP | 2003-311473 | | 11/2003 |

* cited by examiner

HIGH CR NI-BASED ALLOY FILLER MATERIAL AND WELDING ROD FOR SHIELDED METAL ARC WELDING

TECHNICAL FIELD

The present invention relates to a high Cr Ni-based alloy filler material used for welding in a nuclear power plant equipped with pressurized water reactors which operate at a high temperature.

BACKGROUND ART

As disclosed in JP2003-501557A (Patent Document 1: Laid-open Publication of the Japanese National Phase Patent Application), a high Cr Ni-based alloy filler material, which is typically used for heat exchanger tube members for a steam generator in a nuclear power plant equipped a with pressurized water reactor operating at a high temperature of 300 to 350° C., has conventionally been known.

DISCLOSURE OF THE INVENTION

Problem to be Solved by the Invention

The high Cr Ni-based alloy filler material disclosed in the Patent Document 1 has a limit to enhance the weld cracking resistance.

An object of the present invention is to provide a high Cr Ni-based alloy filler material of which weld cracking resistance can sufficiently be increased for which generation of scales is suppressed, and a welding rod for shielded metal arc welding that exhibits sufficiently increased weld cracking resistance.

Means for Solving the Problem

A high Cr Ni-based alloy filler material according to the present invention comprises, in percent by weight, C: 0.04% or less, Si: 0.01 to 0.5%, Mn: 7% or less, Cr: 28 to 31.5%, Nb: 0.5% or less, Ta: 0.005 to 3.0%, Fe: 7 to 11%, Al: 0.01 to 0.4%, Ti: 0.01 to 0.45%, V: 0.5% or less, and, as inevitable impurities, P: 0.02% or less, S: 0.015% or less, O: 0.01% or less, N: 0.002 to 0.1%, and the balance: Ni. According to the high Cr Ni-based alloy filler material according to the present invention, the generation of scales can be suppressed, and thus the weld cracking resistance can sufficiently be increased. Particularly, compared with conventional high Cr Ni-based alloy filler materials, since the amount of Nb is reduced while the amount of Ta is increased, the weld cracking resistance is effectively increased. The behavior and effect of each element as well as the reason for limiting the content of each element will be described below.

C (carbon) is an element that enhances the solid solution. The tensile strength increases as the amount of C increases. However, the stress corrosion cracking resistance decreases as the amount of C increases. Taking the foregoing into consideration, the amount of C is set to 0.04% by weight or less.

Si (silicon) acts for deoxidation during welding. Si of 0.01% by weight or more needs to be added. However, the weld hot cracking susceptibility increases as the amount of Si increases. Therefore, the amount of Si is set to 0.01 to 0.5% by weight.

Mn (manganese) acts for deoxidation and desulfuration during welding. Mn combines with S which gives adverse effect on weld hot cracking resistance, and suppresses weld hot cracking susceptibility. However, when Mn is added over 7% by weight, slag fluidity becomes poor during welding, resulting in reduced welding performance. Therefore, the amount of Mn is set to 7% by weight or less.

Cr (chromium) is an essential element for enhancing the corrosion resistance. To let Cr exhibit sufficient effect to stress corrosion cracking resistance, Cr of 28% by weight or more needs to be added. However, when the amount of Cr exceeds 31.5% by weight, hot-workability in manufacturing filler materials for welding is remarkably reduced. Therefore, the amount of Cr is set to 28 to 31.5% by weight.

Nb (niobium) is an element for generating carbon and nitrogen compounds and enhances the tensile strength. However, the weld cracking resistance decreases as the amount of Nb increases. Therefore, the amount of Nb is set to 0.5% by weight or less.

Ta (tantalum) narrows the co-existence temperature range in solid and liquid phases of an alloy at high temperature and increases the weld cracking resistance. To let Ta exhibit the effect thereof, Ta of 0.005% by weight or more needs to be added. However, as the amount of Ta increases, the ductility is reduced although the strength is enhanced. Therefore, the amount of Ta is set to 0.005 to 3.0% by weight.

Fe (iron) prevents or inhibits the generation of a scale, which is generated when the Cr content is high. When Fe is less than 7% by weight, the scale is generated remarkably. However, when Fe is added exceeding 11% by weight, the stress corrosion cracking resistance is reduced. Therefore, the amount of Fe is set to 7 to 11% by weight.

Al (aluminum) is used as a deoxidation agent to be used for manufacturing a welding rod by melting process. Also, Al combines with N in a deposited metal and contributes to increasing the strength as an N-stabilizing element. To let Al exhibit such effect, it is necessary to add Al of 0.01% by weight or more. However, when the amount of Al is excessive, slag floats on the surface of a molten pool during TIG-welding or MIG-welding. The slag coheres firmly on the surface of weld metal as a scale film, which is a cause of fusion failure or the like, and thus the welding performance is reduced. Therefore, the upper limit of 0.4% by weight is set on the Al amount. Particularly, after careful consideration for attaining increased welding performance, it has been found that a preferred amount of Al is approximately 0.05% by weight in order to obtain stable and superior welding performance without generating the scale film even under a high heat input such as plasma TIG welding.

Ti (titanium) is used as a deoxidation agent since it has high oxidation power like Al. Ti also contributes to improving hot-workability during preparation of the filler material. Since Ti has a strong affinity for N, Ti separates out as TiN. Owing to this, fine structure of grain can be obtained, and thus, Ti contributes to increasing the tensile strength. To let Ti exhibit such effect, Ti of 0.01% by weight or more needs to be added. However, as with Al, when the amount of Ti is excessive, slag is generated during welding, resulting in a decreased welding performance. Therefore the amount of Ti is set to 0.01 to 0.45% by weight.

V (vanadium) forms solid solution in a matrix to enhance the tensile strength, but the ductility decreases when the amount of V exceeds 0.5% by weight. Therefore, the amount of V is set to 0.5% by weight or less.

P (phosphorus) is an inevitable impurity which produces eutectic crystal (Ni—$Ni_3P$ or the like) having a low melting point jointly with Ni. Since P increases the weld cracking susceptibility, the smaller amount of P is better, but excessive limitation of P leads to lowered economical efficiency. Therefore, it is necessary to set the amount of P to 0.02% by weight or less.

S (sulfur) is an inevitable impurity which produces eutectic crystal having a low melting point jointly with Ni as with P. Since S increases the weld cracking susceptibility, the smaller amount of S is better. Therefore, it is necessary to set the amount of S to 0.015% by weight or less.

O (oxygen) is an inevitable impurity which comes from the atmosphere during preparation of the filler material. O gathers in a form of an oxide at the boundary of crystal grain of the weld metal and reduces the high-temperature strength of the boundary of crystal grain. Also, since O increases the welding cracking susceptibility, it is necessary to set the amount of O to 0.01% by weight or less.

N (nitrogen) is an inevitable impurity as with O. It is important to set the limit value for the N content. N produces a nitride with Ti or the like (TiN etc) and contributes to increasing the tensile strength. However, when N exceeds 0.1% by weight, high-temperature ductility decreases. Therefore, N is preferably set to 0.002 to 0.1% by weight.

One or more sorts of elements selected from B (boron), Zr (zirconium) and rare earth elements are preferably added to the high Cr Ni-based alloy filler material of the present invention in the amount of 0.01% by weight or less. In the Ni based alloy, B acts to strengthen the boundary of crystal grain since it separates out at the grain boundary earlier than a sulfide which deteriorates the grain boundary under a high temperature. Particularly, B is effective to inhibit the cracking due to reduced ductility under a high temperature. Preferably, B is added in the amount of 0.001 to 0.005% by weight.

Zr has a strong affinity for O, and is used as a deoxidation agent. However, Zr also has a strong affinity for N, and separates out as ZrN to make the crystal grain much finer, thereby reducing the weld cracking resistance. When an amount of Zr to be added is large, it produces an eutectic compound having a low melting point jointly with Ni, thereby increasing the weld cracking susceptibility.

Further, the rare earth elements typically include La (lanthanum) and Ce (cerium). The rare earth elements demonstrate large deoxidation and desulfuration effects, and act to enhance the grain boundary and thus to inhibit the generation of cracks during hot processing as well as to reduce the welding cracking susceptibility. However, when an amount of the rare earth elements is large, they generate an eutectic compound having a low melting point jointly with Ni, resulting in increased welding cracking susceptibility.

Each of B, Zr and the rare earth elements acts to enhance the weld cracking resistance. The same effect can be obtained by adding a combination thereof. However, excessive addition increases the welding cracking susceptibility. Therefore, one or more sorts of elements selected from B, Zr and rare earth elements are preferably added in the total amount of 0.01% by weight or less.

Further, Ca (calcium) and Mg (magnesium) are preferably added to the high Cr Ni-based alloy filler material of the present invention. Ca and Mg demonstrate strong deoxidation and desulfuration effects. Ordinarily a small amount of Ca and Mg is included in a filler material. However, Ca and Mg have a strong affinity for O. Therefore, unless the amount thereof is limited to less than 0.01% by weight, Ca and Mg will cause a scale film to be formed in TIG welding and MIG-welding. Therefore, the amount of each of Ca and Mg is set to 0.01% by weight or less.

In a welding rod for shielded metal arc welding in accordance with the present invention, the following weld metal is preferably formed after welding. Note that the wording "weld metal" means a metal of a welded portion in which welding rod and base metal are molten with each other and from which slag is removed. That is, the weld metal has the chemical composition comprising, in percent by weight, C: 0.04% or less, Si: 0.01 to 0.5%, Mn: 7% or less, Cr: 28 to 31.5%, Nb: 0.5% or less, Ta: 0.005 to 3.0%, Fe: 7 to 11%, V: 0.5% or less; as inevitable impurities, P: 0.02% or less, S: 0.015% or less, N: 0.002 to 0.1%; and the balance Ni. The behavior and effect of each element as well as the reason for limiting the content of each element are the same as those for the high Cr Ni-based alloy filler material as described above.

Preferably, the weld metal of the welding rod for shielded metal arc welding in accordance with the present invention further includes Al: 0.01 to 0.4%, Ti: 0.01 to 0.45%; one or more sorts of elements selected from B, Zr and rare earth elements: 0.01% or less. The behavior and effect of each element as well as the reason for limiting the content of each element are the same as those for the high Cr Ni-based alloy filler material as described above.

The weld metal formed by shielded metal arc welding in accordance with the present invention has a chemical composition comprising, in percent by weight, C: 0.04% or less, Si: 0.01 to 0.5%, Mn: 7% or less, Cr: 28 to 31.5%, Nb: 0.5% or less, Ta: 0.005 to 3.0%, Fe: 7 to 11%, V: 0.5% or less; as inevitable impurities P: 0.02% or less, S: 0.015% or less, N: 0.002 to 0.1%; and the balance: Ni.

Preferably, the weld metal further includes Al: 0.01 to 0.4% by weight, Ti: 0.01 to 0.45% by weight, one or more sorts of elements selected from B, Zr and rare earth elements: 0.01% by weight or less.

BEST MODE FOR CARRYING OUT THE INVENTION

Figure 1A:
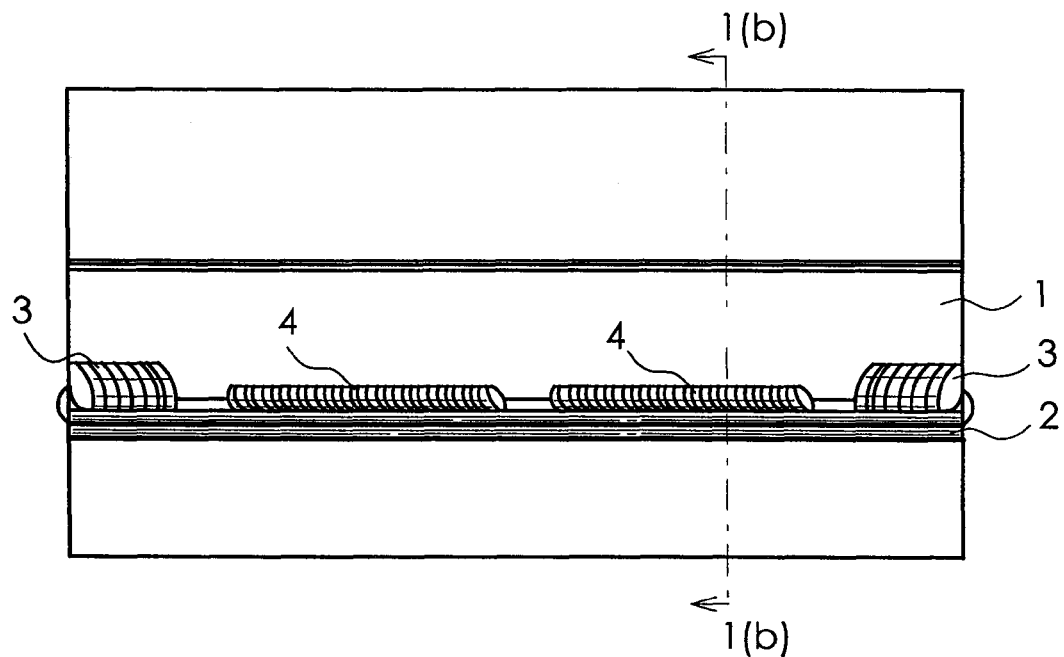
FIG. 1(a) is an illustration which describes a test demonstrating the effect of the present invention.
Figure 1B:
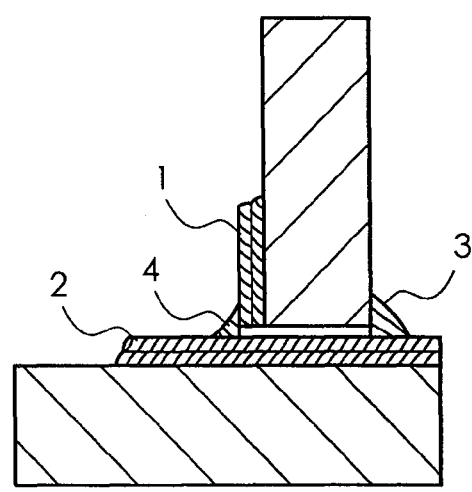
FIG. 1(b) is a cross sectional view as taken along the line b-b in FIG. 1(a).

A support T-shape fillet weld was made by TIG welding using a high Cr Ni-based alloy filler material blended with various elements as shown in Table 1, and the generation of a scale and the state of bead cracking were examined. The support T-shape fillet welding was carried out in conformity to JIS-Z3153 added with a minor modification. As shown in FIGS. 1(a) and (b), support beads 3 and test beads 4 were made using cladding materials 1 and 2, each of which was formed on a carbon steel plate by duplex cladding welding using the test welding materials, combined in a T-like shape interposed by a gap. Table 1 shows the generation of scale and the state of bead cracking. The state of bead cracking was evaluated and classified into the following three categories:

o: only a crater crack was generated,

Δ: a slight crack was generated in test bead, and x: a remarkable crack was generated in the test bead.

TABLE 1

| | Chemical Composition of Filler Material (weight %) | | | | | | | | | | | | | | | | | | | |
|---|---|---|---|---|---|---|---|---|---|---|---|---|---|---|---|---|---|---|---|---|
| | C | Si | Mn | P | S | Ni | Cr | Nb | Ta | Fe | Al | Ti | O | N | V | B | Zr | REM | Ca | Mg | *1 | *2 |
| Comparative example 1 | 0.021 | 0.12 | 0.26 | 0.003 | 0.0008 | Rem. | 28.9 | <0.01 | <0.01 | 8.85 | 0.63 | 0.51 | 0.0006 | 0.005 | 0.02 | <0.0005 | <0.0005 | <0.0005 | <0.0002 | <0.0002 | Y | Δ |
| Comparative example 2 | 0.021 | 0.07 | 5.35 | 0.003 | 0.0017 | Rem. | 29.2 | <0.01 | 2.68 | 8.58 | 0.005 | 0.69 | 0.0041 | 0.005 | 0.01 | <0.0005 | <0.0005 | <0.0005 | <0.0002 | <0.0002 | Y | ○ |
| Comparative example 3 | 0.008 | 0.07 | 5.28 | 0.003 | 0.0016 | Rem. | 29.3 | <0.01 | 2.75 | 8.57 | 0.95 | 0.75 | 0.001 | 0.005 | 0.05 | <0.0005 | <0.0005 | <0.0005 | 0.011 | 0.012 | Y | ○ |
| Comparative example 4 | 0.006 | 0.07 | 5.25 | 0.002 | 0.002 | Rem. | 29.3 | <0.01 | 1.52 | 8.61 | 0.014 | 0.68 | 0.0043 | 0.005 | 0.1 | <0.0005 | <0.0005 | <0.0005 | <0.0002 | <0.0002 | Y | ○ |
| Comparative example 5 | 0.008 | 0.07 | 5.41 | 0.003 | 0.002 | Rem. | 29 | <0.01 | 2.67 | 8.52 | 0.007 | 0.69 | 0.0057 | 0.005 | 0.2 | <0.0005 | <0.0005 | <0.0005 | <0.0002 | <0.0002 | Y | ○ |
| Comparative example 6 | 0.023 | 0.4 | 0.81 | 0.005 | 0.0009 | Rem. | 28.96 | <0.01 | 1.18 | 9.01 | 0.071 | 0.21 | 0.0021 | 0.0022 | <0.01 | <0.0005 | <0.0005 | <0.0005 | 0.015 | 0.015 | Y | ○ |
| Comparative example 7 | 0.032 | 0.31 | 3.51 | 0.011 | 0.001 | Rem. | 29.65 | 0.32 | 3.5 | 10.21 | 0.51 | 0.03 | 0.0095 | 0.0045 | 0.3 | 0.0005 | 0.003 | 0.001 | <0.0002 | <0.0002 | Y | ○ |
| Example 1 | 0.022 | 0.03 | 0.81 | 0.003 | 0.0009 | Rem. | 28.93 | <0.01 | 1.18 | 9.01 | 0.081 | 0.18 | 0.0019 | 0.0024 | <0.01 | <0.0005 | <0.0005 | <0.0005 | <0.0002 | <0.0002 | N | ○ |
| Example 2 | 0.023 | 0.03 | 0.79 | 0.003 | 0.0009 | Rem. | 29.27 | <0.01 | 2.26 | 9.16 | 0.059 | 0.18 | 0.001 | 0.0023 | <0.01 | <0.0005 | <0.0005 | <0.0005 | <0.0002 | <0.0002 | N | ○ |
| Example 3 | 0.023 | 0.02 | 0.81 | 0.002 | 0.0009 | Rem. | 29.33 | <0.01 | 0.93 | 9.18 | 0.065 | 0.18 | 0.0012 | 0.0022 | <0.01 | 0.0025 | <0.0005 | <0.0005 | 0.0003 | <0.0002 | N | ○ |
| Example 4 | 0.032 | 0.45 | 3.5 | 0.006 | 0.001 | Rem. | 30.5 | 0.05 | 1.56 | 7.5 | 0.045 | 0.15 | 0.0023 | 0.02 | 0.3 | 0.005 | 0.002 | <0.0005 | 0.0004 | 0.005 | N | ○ |
| Example 5 | 0.0031 | 0.35 | 3.9 | 0.005 | 0.002 | Rem. | 29.5 | 0.08 | 0.5 | 10 | 0.12 | 0.21 | 0.003 | 0.01 | 0.15 | 0.003 | 0.003 | 0.001 | 0.0002 | <0.0002 | N | ○ |
| Example 6 | 0.021 | 0.03 | 0.82 | 0.002 | 0.0009 | Rem. | 30.37 | <0.01 | 0.09 | 9.47 | 0.037 | 0.18 | 0.0011 | 0.0023 | <0.01 | 0.0022 | <0.0005 | <0.0005 | <0.0002 | <0.0002 | N | ○ |
| Comparative example 8 | 0.021 | 0.02 | 0.8 | 0.007 | 0.001 | Rem. | 30.81 | 0.78 | 0.002 | 9.32 | 0.071 | 0.18 | 0.0015 | 0.0021 | 0.2 | 0.001 | 0.001 | 0.002 | <0.0002 | <0.0002 | N | Δ |
| Comparative example 9 | 0.024 | 0.21 | 2.54 | 0.006 | 0.002 | Rem. | 30.26 | 0.15 | 0.003 | 10.3 | 0.12 | 0.35 | 0.0078 | 0.015 | 0.35 | 0.001 | 0.002 | 0.001 | <0.0002 | <0.0002 | N | Δ |
| Comparative example 10 | 0.021 | 0.01 | 1.2 | 0.003 | 0.0008 | Rem. | 29.68 | <0.01 | 0.85 | 9.2 | 0.062 | 0.21 | 0.0024 | 0.0032 | 0.02 | 0.012 | <0.0005 | <0.0005 | <0.0002 | <0.0002 | N | x |
| Comparative example 11 | 0.022 | 0.03 | 0.95 | 0.002 | 0.001 | Rem. | 30.15 | <0.01 | 0.71 | 10.5 | 0.055 | 0.23 | 0.0033 | 0.0054 | 0.03 | <0.0005 | 0.013 | <0.0005 | <0.0002 | <0.0002 | N | x |
| Comparative example 12 | 0.025 | 0.02 | 1.12 | 0.001 | 0.002 | Rem. | 30.12 | <0.01 | 0.65 | 9.7 | 0.041 | 0.19 | 0.0045 | 0.0022 | 0.06 | <0.0005 | <0.0005 | 0.011 | <0.0002 | <0.0002 | N | x |
| Comparative example 13 | 0.029 | 0.32 | 1.23 | 0.003 | 0.001 | Rem. | 30.02 | <0.01 | 1.23 | 9.45 | 0.021 | 0.12 | 0.0056 | 0.012 | 0.12 | 0.006 | 0.008 | <0.0005 | <0.0002 | <0.0002 | N | x |
| Comparative example 14 | 0.022 | 0.14 | 1.02 | 0.002 | 0.001 | Rem. | 29.6 | <0.01 | 2.21 | 8.65 | 0.062 | 0.21 | | | | | | | | | | |
| Comparative example 15 | 0.021 | 0.02 | 0.84 | 0.005 | 0.001 | Rem. | 29.68 | <0.01 | 0.98 | 10.2 | 0.025 | 0.15 | | | | | | | | | | |
| Comparative example 16 | 0.018 | 0.08 | 2.65 | 0.009 | 0.001 | Rem. | 30.25 | <0.01 | 1.11 | 10.5 | 0.23 | 0.35 | | | | | | | | | | |

TABLE 1-continued

| | | | | | | | | | | |
|---|---|---|---|---|---|---|---|---|---|---|
| Comparative example 14 | 0.0032 | 0.023 | 0.15 | 0.006 | <0.0005 | 0.006 | <0.0002 | <0.0002 | N | x |
| Comparative example 15 | 0.011 | 0.025 | 0.04 | <0.0005 | 0.007 | 0.004 | <0.0002 | <0.0002 | N | x |
| Comparative example 16 | 0.0085 | 0.007 | 0.05 | 0.003 | 0.005 | 0.004 | <0.0002 | <0.0002 | N | x |

*1: Whether or not scale was generated in cladding by welding Y: Yes N: No
*2: State of weld cracking on test bead in T-shape fillet welding Table 1 demonstrates that, in the filler materials of the examples 1 to 6 in accordance with the present invention, no scale was generated, and no weld crack other than a crater crack was generated. On the other hand, in the filler materials of the comparative examples 1 to 7 in which the amounts of Al—Ti, Ca and Mg were different from those in the present invention, it was found that a scale was generated. Also, in the filler materials of the comparative examples 8, 9 in which the amounts of Nb and Ta were different from those in the present invention, it was found that a few cracks were generated on the test beads. In the filler materials of the comparative examples 10 to 16, in which the amount of one or more sorts of elements selected from B, Zr and rare earth elements was different from that of the present invention, remarkable cracks were found on the test beads. Particularly, in the filler material of the comparative example 8 based on the conventional art (Laid-open Publication No. 2003-501557 of the Patent Application), it was found that a few cracks were generated on the test beads.

Next, using shielded welding rods, which generate various weld metal compositions after welding as shown in Table 2, support T-shape fillet welding was made by shielded metal arc welding and the state of bead cracking was examined. The support T-shape fillet welding was made in the same manner as that of the tests shown in Table 1. Table 2 also shows the state of bead cracking. The state of bead cracking was evaluated in the same manner as that of the test shown in Table 1.

TABLE 2

| | Chemical Composition of Weld Metal (weight %) | | | | | | | | | | | | | | | |
|---|---|---|---|---|---|---|---|---|---|---|---|---|---|---|---|---|
| | C | Si | Mn | P | S | Ni | Cr | Nb | Ta | Fe | N | V | B | Zr | REM | *3 |
| Comparative example 17 | 0.028 | 0.33 | 4.29 | 0.009 | 0.005 | Rem. | 28.56 | 1.46 | 0.01 | 8.3 | 0.024 | 0.03 | 0.0006 | <0.0005 | <0.0005 | Δ |
| Comparative example 18 | 0.031 | 0.35 | 4.01 | 0.008 | 0.006 | Rem. | 29.12 | 0.89 | 0.04 | 7.5 | 0.026 | 0.03 | <0.0005 | <0.0005 | <0.0005 | Δ |
| Comparative example 19 | 0.028 | 0.33 | 4.29 | 0.012 | 0.003 | Rem. | 28.56 | 0.64 | 0.2 | 8.3 | 0.031 | 0.03 | <0.0005 | <0.0005 | <0.0005 | Δ |
| Comparative example 20 | 0.032 | 0.45 | 3.56 | 0.011 | 0.005 | Rem. | 29.68 | 0.31 | 0.003 | 10.5 | 0.045 | 0.05 | <0.0005 | <0.0005 | <0.0005 | Δ |
| Comparative example 21 | 0.029 | 0.41 | 5.21 | 0.006 | 0.004 | Rem. | 29.5 | 0.05 | 1.21 | 9.21 | 0.04 | 0.21 | 0.012 | <0.0005 | <0.0005 | x |
| Comparative example 22 | 0.031 | 0.36 | 4.85 | 0.007 | 0.005 | Rem. | 30.12 | 0.02 | 0.98 | 8.96 | 0.035 | 0.15 | 0.005 | 0.014 | <0.0005 | x |
| Comparative example 23 | 0.036 | 0.29 | 3.24 | 0.013 | 0.008 | Rem. | 31.2 | 0.25 | 1.15 | 10.1 | 0.051 | 0.35 | <0.0005 | <0.0005 | 0.011 | x |
| Comparative example 24 | 0.025 | 0.36 | 3.98 | 0.009 | 0.005 | Rem. | 28.65 | 0.45 | 1.02 | 7.88 | 0.04 | 0.02 | 0.005 | 0.007 | <0.0005 | x |
| Comparative example 25 | 0.034 | 0.45 | 3.65 | 0.008 | 0.004 | Rem. | 29.63 | 0.36 | 0.89 | 9.76 | 0.031 | 0.04 | 0.006 | <0.0005 | 0.005 | x |
| Comparative example 26 | 0.034 | 0.26 | 4.21 | 0.011 | 0.007 | Rem. | 30.25 | 0.43 | 2.54 | 10.26 | 0.068 | 0.12 | <0.0005 | 0.006 | 0.006 | x |
| Comparative example 27 | 0.032 | 0.38 | 4.02 | 0.007 | 0.005 | Rem. | 29.98 | 0.21 | 2.02 | 9.14 | 0.039 | 0.36 | 0.005 | 0.004 | 0.003 | x |
| Example 7 | 0.023 | 0.25 | 3.59 | 0.006 | 0.004 | Rem. | 28.6 | 0.01 | 0.09 | 9.56 | 0.032 | 0.01 | 0.002 | 0.0006 | <0.0005 | ○ |
| Example 8 | 0.021 | 0.31 | 4.25 | 0.008 | 0.004 | Rem. | 29.2 | 0.01 | 1.21 | 10.25 | 0.025 | 0.08 | 0.003 | 0.0006 | <0.0005 | ○ |
| Example 9 | 0.031 | 0.26 | 3.69 | 0.015 | 0.006 | Rem. | 28.3 | 0.01 | 2.3 | 7.23 | 0.041 | 0.21 | 0.004 | 0.0007 | 0.002 | ○ |
| Example 10 | 0.024 | 0.21 | 3.98 | 0.006 | 0.004 | Rem. | 28.9 | 0.01 | 2.4 | 9.85 | 0.031 | 0.32 | 0.002 | 0.003 | <0.0005 | ○ |

*3: State of weld cracking on test bead in T-shape fillet welding

It is known from Table 2 that in the examples 7-10 of the present invention, no weld crack other than a crater crack was generated. On the other hand, in the welding rods of the comparative examples 17-20 including Nb and Ta in the amounts different from those of the present invention, it was found that a few cracks were generated on the test beads. Also, in the welding rods of the comparative examples 21 to 27 in which the amount of one or more sorts of elements selected from B, Zr and rare earth elements was different from that of the invention, remarkable cracks were found on the test beads.

Figure 2A:
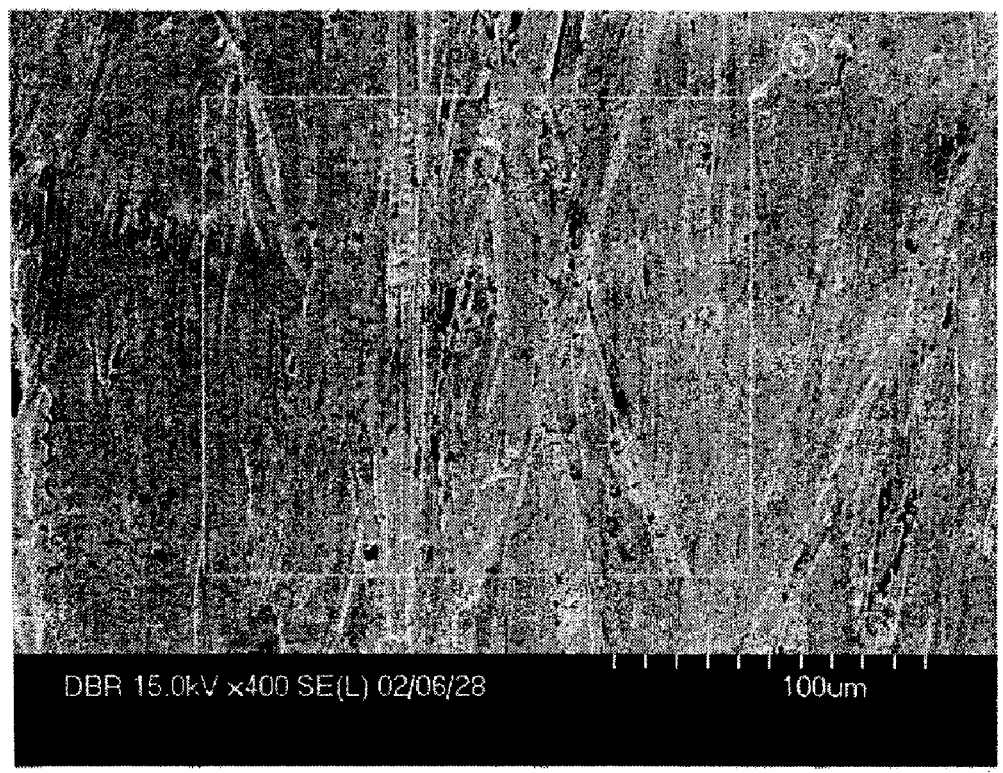
FIG. 2(a) is an electron microscopic picture of a weld surface of a test bead of an embodiment in accordance with the present invention.
Figure 2B:
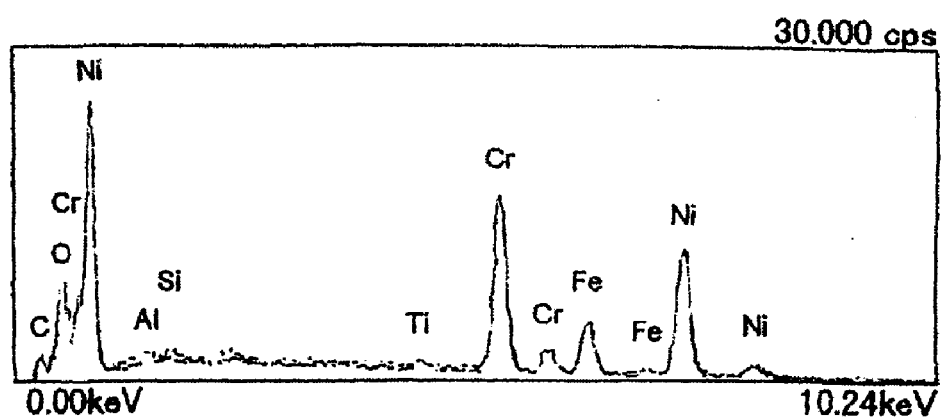
FIG. 2(b) is a diagram showing a result of SEM-EDX qualitative analysis of a test bead of the embodiment in accordance with the invention.
Figure 3A:
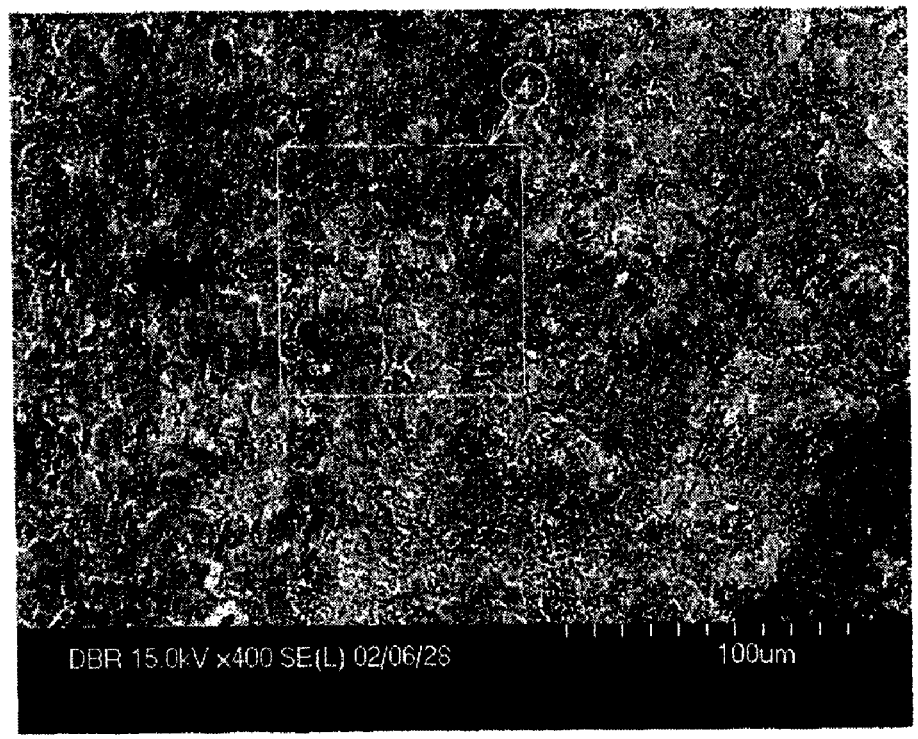
FIG. 3(a) is an electron microscopic picture of a weld surface of a test bead of a comparative example for the present invention.
Figure 3B:
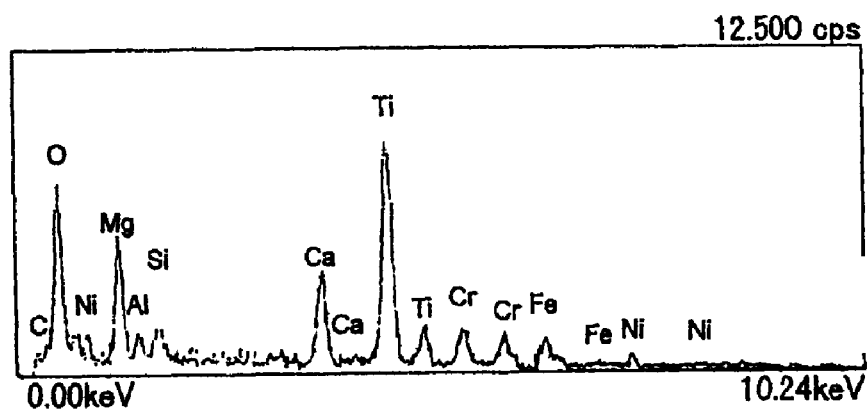
FIG. 3(b) is a diagram showing a result of a SEM-EDX qualitative analysis of a test bead of the comparative example for the invention.

FIGS. 2(a) and 2(b) show an electron microscopic picture of a weld surface of test beads of the example 3 in the above tests and a result of the qualitative analysis by means of SEM-EDX respectively. FIGS. 3(a) and 3(b) and FIGS. 4(a) and 4(b) show an electron microscopic picture of a weld surface of the test beads in the comparative example 4 and comparative example 7 and a result of qualitative analysis by means of SEM-EDX in the above tests respectively. FIG. 2(a) demonstrates that, in the example 3, a scale was not generated on the weld surface of the test bead. On the other hand, FIG.

Figure 4A:
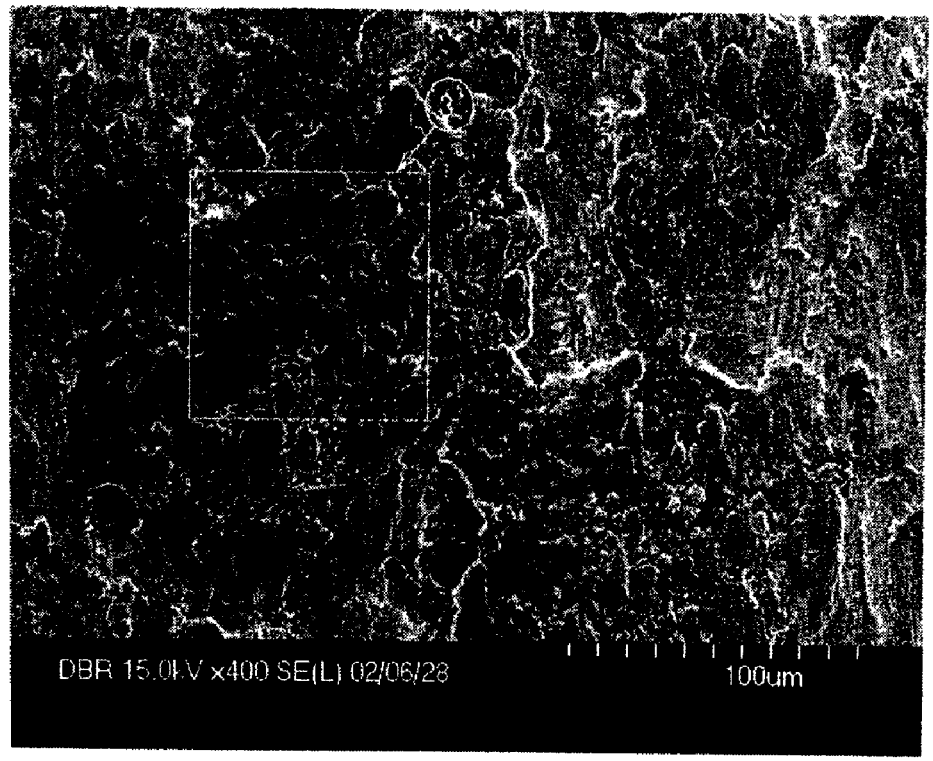
FIG. 4(a) is an electron microscopic picture of a weld surface of a test bead of another comparative example for the present invention.
Figure 4B:
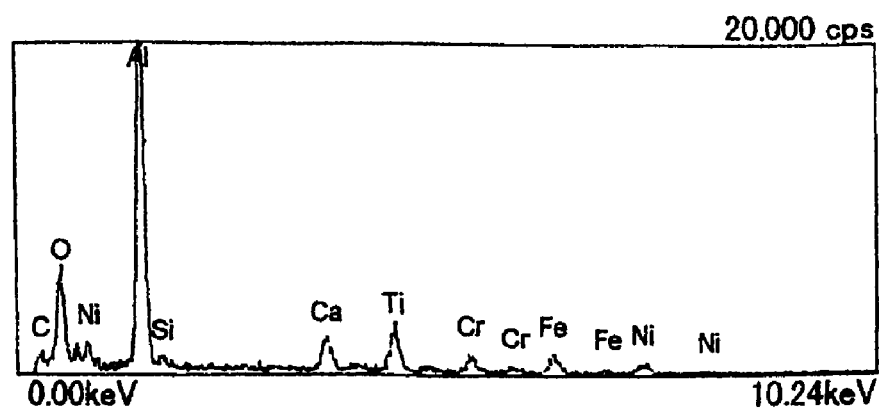
FIG. 4(b) is a diagram showing a result of a SEM-EDX qualitative analysis of a test bead of another comparative example for the invention.

3(a) and FIG. 4(a) demonstrate that, in the comparative examples 4, 7, a scale was generated on the weld surface of the test bead. Also, FIG. 3(b) demonstrates that, in the comparative example 4, the amount of Ti on the weld surface is large and FIG. 4(b) demonstrates that, in the comparative example 7, the amount of Al on the weld surface is large. From the above, the present invention prevents the generation of a scale by appropriately controlling the amount of Al and Ti.

INDUSTRIAL APPLICABILITY

The high Cr Ni-based alloy filler material according to the present invention inhibits the generation of scales and enhances the weld cracking resistance.

The invention claimed is:

1. A high Cr Ni-based alloy filler material used for welding in a nuclear power plant consisting of, in percent by weight, C: more than 0% and 0.04% or less, Si: 0.01 to 0.5%, Mn: more than 0% and 7% or less, Cr: 28 to 31.5%, Nb: more than 0% and 0.5% or less, Ta: 0.005 to 3.0%, Fe: 7 to 11%, Al: 0.01 to 0.4%, Ti: 0.01 to 0.45%, V: more than 0% and 0.5% or less, one or more elements selected from B, Zr and rare earth elements: more than 0% and 0.01% or less, Ca: more than 0% and 0.01% or less, Mg: more than 0% and 0.01% or less, and, as inevitable impurities, P: more than 0% and 0.02% or less, S: more than 0% and 0.015% or less, O: more than 0% and 0.01% or less, N: 0.002 to 0.1%, and the balance: Ni.

2. A welding rod for shielded metal arc welding in a nuclear power plant from which a weld metal can be formed, the weld metal consisting of, in percent by weight, C: more than 0% and 0.04% or less, Si: 0.01 to 0.5%, Mn: more than 0% and 7% or less, Cr: 28 to 31.5%, Nb: more than 0% and 0.5% or less, Ta: 0.005 to 3.0%, Fe: 7 to 11%, V: more than 0% and 0.5% or less, one or more elements selected from B, Zr and rare earth elements: more than 0% and 0.01% or less, and as inevitable impurities, P: more than 0% and 0.02% or less, S: more than 0% and 0.015% or less, N: 0.002 to 0.1%, and the balance: Ni.

3. A weld metal formed by shielded metal arc welding in a nuclear power plant, consisting of, in percent by weight, C: more than 0% and 0.04% or less, Si: 0.01 to 0.5%, Mn: more than 0% and 7% or less, Cr: 28 to 31.5%, Nb: more than 0% and 0.5% or less, Ta: 0.005 to 3.0%, Fe: 7 to 11%, V: more than 0% and 0.5% or less, one or more elements selected from B, Zr and rare earth elements: more than 0% and 0.01% or less, and as inevitable impurities, P: more than 0% and 0.02% or less, S: more than 0% and 0.015% or less, N: 0.002 to 0.1%, and the balance: Ni.

* * * * *